US007072761B2

(12) United States Patent
Hawkins et al.

(10) Patent No.: US 7,072,761 B2
(45) Date of Patent: Jul. 4, 2006

(54) REDUNDANT ENGINE SHUTDOWN SYSTEM

(75) Inventors: Jeffery S. Hawkins, Farmington Hills, MI (US); Curtis P. Ritter, Dearborn, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/526,345

(22) PCT Filed: Oct. 10, 2002

(86) PCT No.: PCT/US02/32384

§ 371 (c)(1),
(2), (4) Date: Mar. 2, 2005

(87) PCT Pub. No.: WO2004/033879

PCT Pub. Date: Apr. 22, 2004

(65) Prior Publication Data

US 2006/0015244 A1 Jan. 19, 2006

(51) Int. Cl.
*F02D 17/04* (2006.01)
*F02D 41/22* (2006.01)
*G06F 19/00* (2006.01)

(52) U.S. Cl. ............. 701/112; 123/179.15; 123/198 D; 701/114

(58) Field of Classification Search ................ 701/112, 701/114, 102, 115; 123/198 D, 179.15
See application file for complete search history.

(56) References Cited

U.S. PATENT DOCUMENTS

| | | | |
|---|---|---|---|
| 4,102,316 A | 7/1978 | Valbert | |
| 4,515,125 A | 5/1985 | Buck et al. | |
| 4,712,372 A * | 12/1987 | Dickey et al. | 60/39.281 |
| 4,831,277 A * | 5/1989 | Christopher | 290/1 A |
| 5,070,832 A * | 12/1991 | Hapka et al. | 123/198 D |
| 5,263,824 A | 11/1993 | Waldbeser et al. | |
| 5,422,808 A | 6/1995 | Catanese, Jr. | |
| 5,549,097 A | 8/1996 | Nimberger | |
| 5,709,079 A | 1/1998 | Smith | |
| 6,470,259 B1 * | 10/2002 | Round | 701/112 |

OTHER PUBLICATIONS

Detroit Diesel Application and Installation Manual, Hardware and Wiring, 7SA742 0110, 2001 Detroit Diesel Corporation, p. 3-108 and p. 3-180.

(Continued)

*Primary Examiner*—Hieu T. Vo
(74) *Attorney, Agent, or Firm*—Brooks Kushman P.C.

(57) ABSTRACT

An engine shutdown system is provided that includes an engine control module (ECM) (12) having sensors (20, 22, 24, 26, 28, 30, 34, 36) that can activate an engine shutdown sequence. A set of redundant sensors (20', 22', 24', 26', 28', 30', 32', 34', 36') and a redundant engine control module (RECM) (14) can also activate an engine shutdown sequence independent of the ECM. Engine operating parameters are monitored by sensors to determine if one of the engine parameters deviates from an acceptable level. If the engine control determines that a parameter has exceeded a predetermined level, an engine shutdown signal may be generated by either the ECM or RECM that may cut off the fuel supply, interrupt an ignition circuit, or activate external engine shutdown devices and may also activate alarm and message panels. A redundant engine shutdown system is also provided to disable the primary engine control unit.

20 Claims, 3 Drawing Sheets

OTHER PUBLICATIONS

BSI, British Standard, Reciprocating Internal Combustion Engines—Safety Requirements for design and construction of engines for use in potentially explosives atmospheres—Part 1: Group II engines for use in flammable gas and vapour atmospheres.

* cited by examiner

REDUNDANT ENGINE SHUTDOWN SYSTEM

The present invention relates to shutdown controls for internal combustion engines.

BACKGROUND OF THE INVENTION

Internal combustion engines are used in a wide variety of stationary as well as mobile applications. Internal combustion engines may include either spark ignition engines or compression ignition engines. Stationary internal combustion engines used for air compressors or electrical power generation are frequently used in mining operations in chemical plants or military installations. In such applications, conditions may exist that require an engine control system to shut down the engine. For example, if the engine coolant temperature exceeds a threshold the engine should be shut down. Engines operating in particular applications such as environments having hazardous combustible gases or fire pump applications are required to meet certification requirements to ensure safe operation. Such engines may be required to have an engine shutdown control system.

Engines operating in hazardous environments require certification for their specific environment. For example, hazardous environment applications may be categorized as Group II zone 2 or class 1 division 2. Hazardous environment applications typically require a redundant engine shutdown system in addition to the standard engine shutdown system that is available on most, if not all, commercially available electronically controlled engines. For example, standard EN 1834-1 "Reciprocating internal combustion engines—Safety requirements for design and construction of engines for use in potentially explosive atmospheres—Part 1: Group II engines for use in flammable gas and vapor atmospheres" and the ATEX directive require a redundant engine shutdown system. To meet this standard it has been proposed to use the engine controller as a shut down system, however, this approach does not meet all requirements for an engine shutdown system under the standard.

The above problems are addressed by Applicants' invention as summarized below.

SUMMARY OF THE INVENTION

According to one aspect of the present invention, an engine control system and engine are provided in combination that has at least one engine or electronic control module for controlling engine operation in normal operating conditions. The engine control module (ECM) includes calibrations for engine control and also has a primary shutdown system programmed to shut down the engine if one or more of a plurality of engine operating parameters deviate from an acceptable level. At least one redundant electronic control module (RECM) is programmed to shut down the engine if one or more of the plurality of engine operation parameters deviates from an acceptable level.

According to another aspect of the invention, the engine control module and shutdown system electronic control module are structurally identical but programmed differently. The ECM provides full engine control functions including the software for engine shutdown. The RECM is structurally identical to the ECM but is programmed differently so that the engine module provides full engine control functions including software for engine shutdown while the shutdown system module only includes software to provide engine shutdown. Alternatively, the ECM and RECM may both be programmed to provide full engine control functions including software for engine shutdown so that the RECM can be used in place of the ECM.

According to other aspects of the invention, the ECM and RECM may monitor a wide variety of sensors or other indicators to determine if a sensor or indicator indicates that the engine parameter is above a threshold level. Examples of sensors that are directly related to the engine operation that may be monitored include engine coolant temperature sensors, oil temperature sensors, exhaust temperature sensors, oil pressure sensors, turbo-charger compressor outlet temperature sensor, coolant level monitor, engine oil level monitor, engine RPM tachometer, inter-cooler temperature, and engine vibration sensors. The control system may also monitor sensors that are not associated with the engine. Examples of external sensors include environmental gas detection sensors for sensing the presence of potentially dangerous gasses in the air around the engine and transmission temperature monitors.

The ECM or RECM may shut down the engine in various ways including shutting off fuel supply, air supply, or electronic control signals. Either system may also be used to trigger an external shutdown system such as a Halon injection system or an air shut off valve. If sensors indicate a deviation from the acceptable level and the ECM fails to shut down the engine, the RECM may activate an alarm or send a shutdown command to the engine electronic control module by means of a digital communication link.

These and other aspects of the invention will become apparent in view of the attached drawings and detailed description of a preferred embodiment of the invention.

DETAILED DESCRIPTION OF THE PREFERRED EMBODIMENT(S)

Figure 1B:
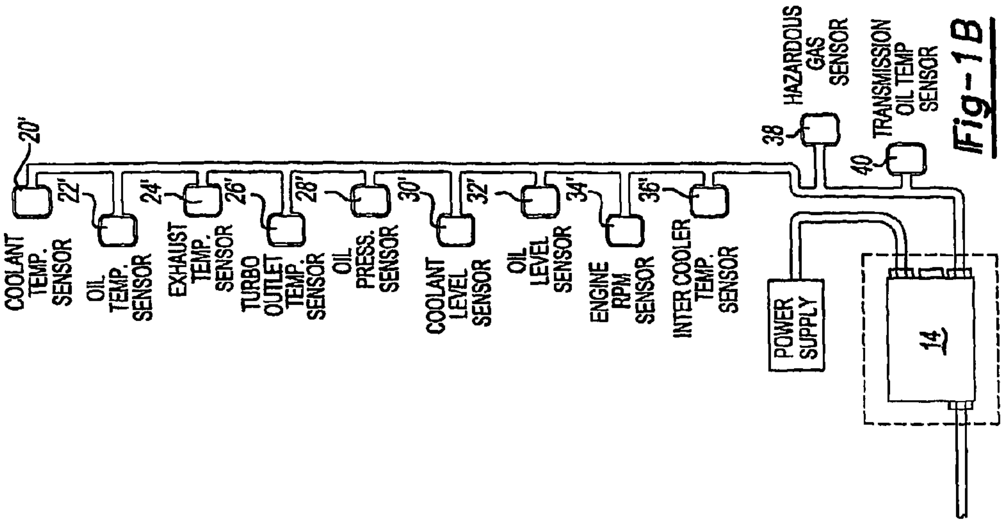
FIG. 1B is a schematic representation of a shutdown ECM.
Figure 1A:
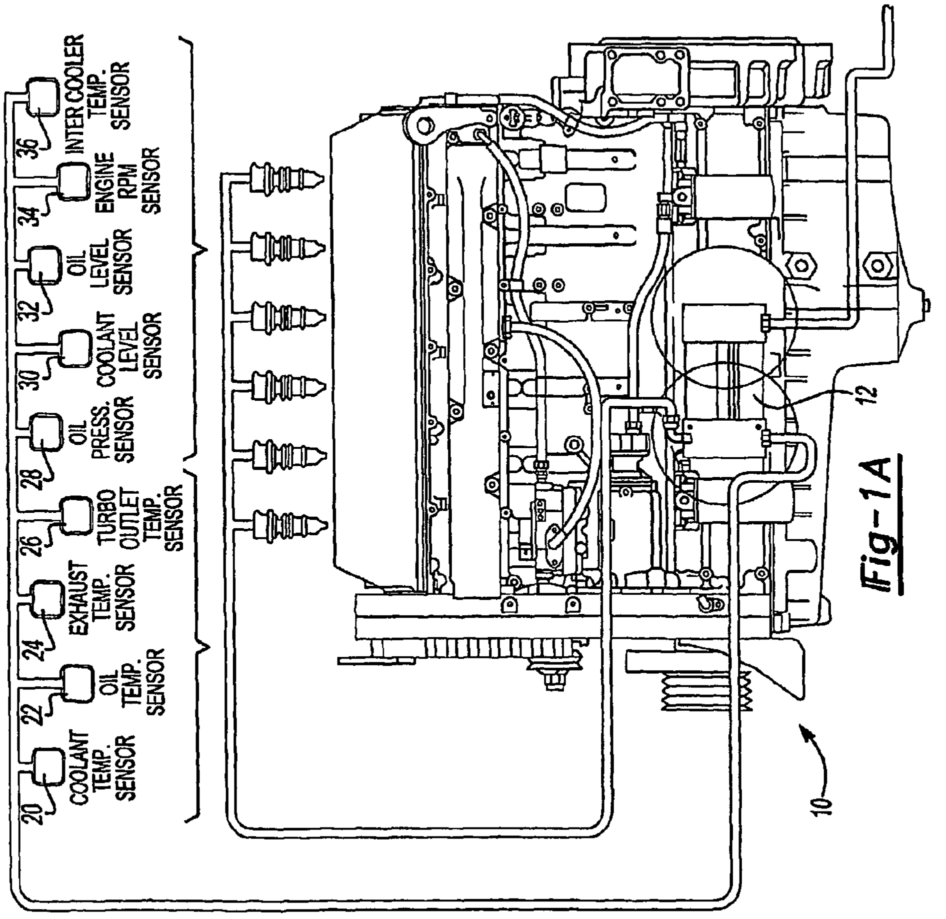
FIG. 1A is a partially schematic side elevation view of a compression ignition internal combustion engine.

Referring now to FIGS. 1A and 1B, an engine 10 is shown that is a compression ignition engine. An ECM 12 that is calibrated to operate the engine 10. The ECM 12 is programmed to shut down the engine in certain circumstances. A shut down ECM 14 is shown in FIG. 1B. The shut down ECM 14 may be attached to the engine 10 or may be mounted at a location remote from the engine. The engine includes sensors that detect specified engine operating conditions. A coolant temperature sensor 20 senses the temperature of the engine coolant. An oil temperature sensor 22 senses the temperature of the oil. An exhaust temperature sensor 24 is provided for sensing the temperature of the exhaust. A turbocharger compressor outlet temperature sensor 26 is provided for sensing the temperature of the turbocharger compressor outlet air. Turbocharger compressor outlet temperature can also be calculated. An oil pressure sensor 28 is provided to sense the pressure of the oil circulating in the engine. A coolant level sensor 30 senses the coolant level. An oil level sensor 32 senses the level of the oil in the oil reservoir. A tachometer 34 senses the speed of the engine operation and may be expressed in terms of RPM. An intercooler temperature sensor 36 may be used, if desired, to monitor the temperature of an intercooler. An engine vibration sensor or a variety of other sensors can also be provided.

If required under relevant standards, the shutdown ECM may have a corresponding set of redundant sensors. As shown in FIG. 1B, redundant sensors 20' to 36' corresponding to the sensors 20 to 36 connected to the ECM 12 are indicated by corresponding primed reference numerals. In addition to the above sensors, other external sensors (not associated with the engine) may be provided that are monitored by the shutdown ECM 14 for engine shut down conditions such as a hazardous gas sensor 38 or a transmission fluid temperature sensor 40.

Figure 2:
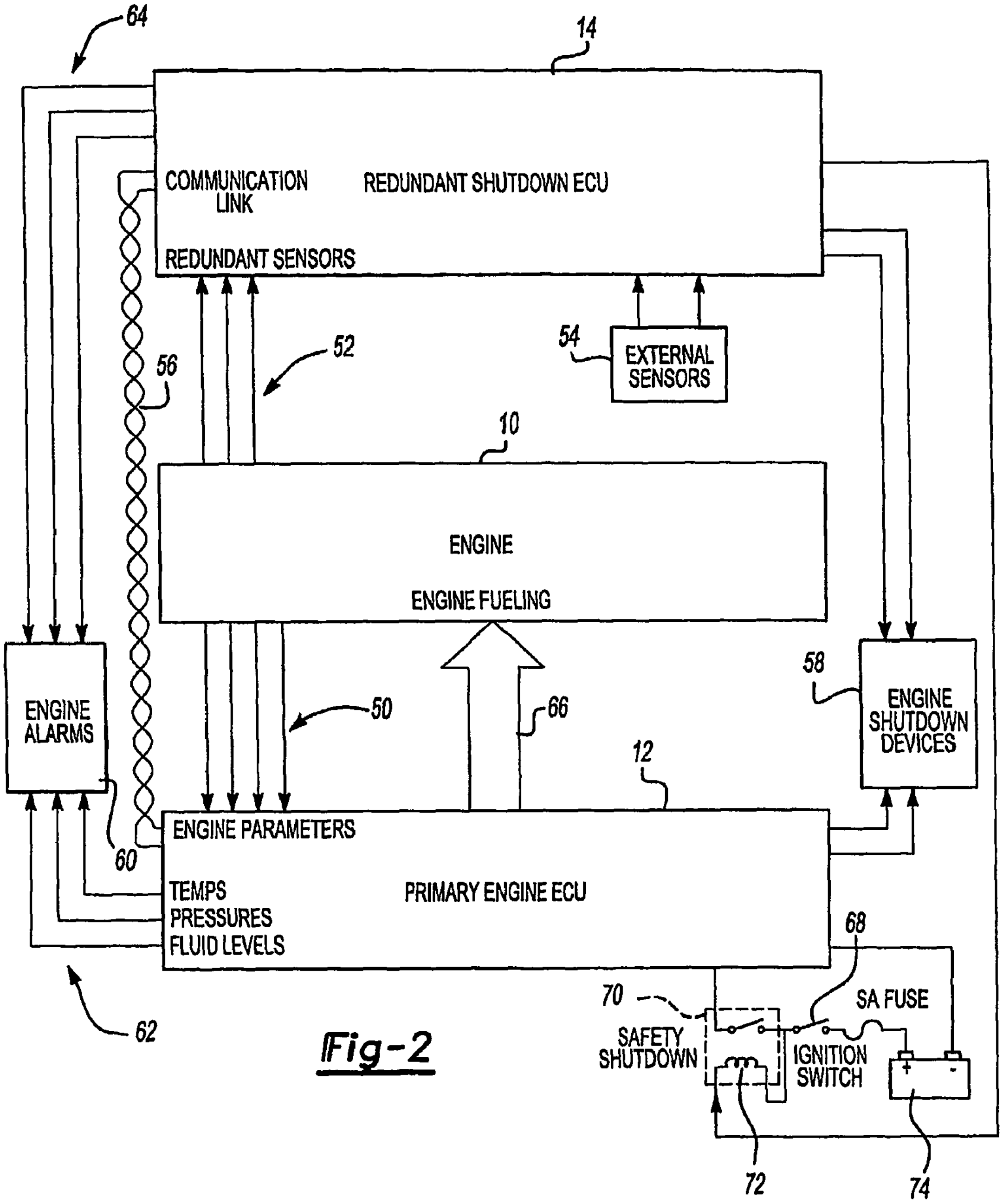
FIG. 2 is a schematic representation of a redundant shutdown device controlling external engine shutdown, alarms, and other displays that are activated in response to monitored engine sensors and external sensors.

Referring now to FIG. 2, a control system diagram is provided wherein the engine 10 is controlled by and provides sensor outputs 50 to a primary engine ECU 12. Redundant sensor outputs 52 are provided to the redundant shutdown ECM 14. In addition, external sensors 54 provide outputs to the redundant shutdown ECM 14. The sensor outputs 50 correspond generally to sensors 20 to 36 in FIG. 1A, while the redundant sensor outputs correspond to redundant sensors 20' to 36' in FIG. 1B. External sensors 54 correspond to hazardous gas sensor 38 and transmission oil temperature sensor 40 but may also include other sensors that are external to the engine 10.

Timers may also be included as part of the engine shutdown logic. For example, if a first threshold level is exceeded, torque reduction may be required. If then the second threshold is exceeded, a 30 second timer may be activated prior to shutdown. However, the RECM, most likely, will be an immediate shutdown.

A communication link 56 establishes communication between the redundant shutdown ECM 14 and the primary engine ECU 12. Engine shutdown devices 58 may be activated by either the primary engine ECU 12 or the redundant shutdown ECM 14 in response to either receiving an appropriate output from any of the sensors referred to by reference numerals 50, 52 or 54.

Engine shutdown devices 58 may include an air flap or valve that cuts off air to the engine or could also be a Halon injection system that injects Halon or other inert gas into the engine for rapid shutdown.

Alarm 60 may be activated by primary ECU alarm output 62 or redundant ECU alarm output 64. For example, if one of the temperatures, pressures, or fluid levels monitored by the primary engine ECU 12 or the redundant shutdown ECM 14 exceeds a threshold level, an engine alarm 60 will be activated to alert responsible personnel as to the sensed problem.

Engine fueling controls 66 are generally controlled by the primary engine ECU 12 as indicated by the fueling controls arrow 66. It is possible that software for controlling the engine fueling could also be provided in the engine shutdown ECM 14. However, that software may not be enabled to control engine fueling unless the redundant shutdown ECM 14 was to be substituted for the primary engine ECU 12 in an emergency. In this situation, the software could be enabled by switching appropriate wires from the ECM to the RECM to control the engine fuel system.

An ignition switch 68 circuit based engine shutdown mechanism could be provided, for example, by providing a safety shutdown circuit 70 in series with the ignition switch 68. The safety shutdown circuit 70 shown comprises a normally closed relay 72 that is opened upon receiving a shutdown signal from either the primary engine ECU 12 or the redundant shutdown ECM 14. Other ECU ignition disabling circuits could also be used. If the safety shutdown circuit 70 is activated, the power connection to the battery 74 is interrupted to cause engine shutdown.

Figure 3:
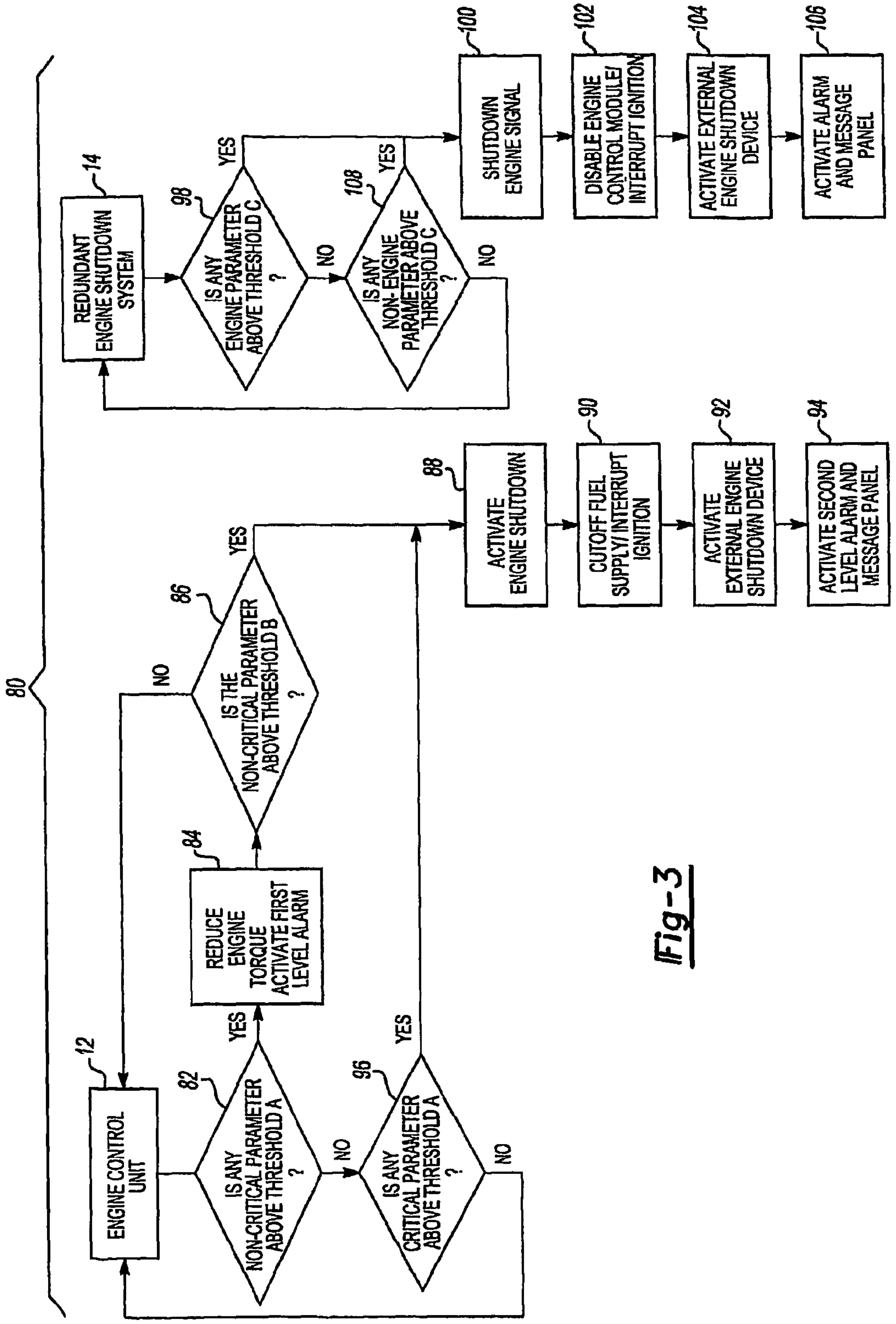
FIG. 3 is a flow chart illustrating the process of the present invention wherein engine parameters are monitored along with external sensors to determine if the engine should be shut down due to the detection of hazardous conditions.

Referring to FIG. 3, a flowchart is provided that illustrates an algorithm that may be used in accordance with the present invention to control engine shutdown in both the ECM 12 and the shutdown control module 14. The redundant system 80 includes both the engine control unit 12 and the redundant engine shutdown system 14.

As it relates to the engine control unit 12, the system determines at 82 if any multiple threshold parameter is above threshold A. Examples of multiple threshold parameters would include outputs of sensors 20–26. For example, if the oil temperature sensor is classified as a multiple threshold parameter, a threshold temperature of 100° C. could be set as threshold A which upon exceeding threshold A, the engine control unit would reduce engine torque and activate a first level alarm at 84. The system will continue to monitor the parameter and at 86 would determine if the multiple threshold parameter is above threshold B. In the example, the threshold B for the oil temperature sensor could be 120° C. Upon exceeding threshold B, the primary ECU generates an engine shutdown signal at 88. Upon generating the shutdown engine signal at 88, the system could cut off fuel supply or interrupt the ignition circuit at 90. The system could also activate external engine shutdown devices at 92 and activate second level alarm and message panel outputs at 94.

If the multiple threshold parameter was not exceeded, the system could then determine if any critical parameter is above threshold A. Alternatively, the system could be programmed to check critical parameters first and then check multiple threshold parameters. If a critical parameter exceeds a threshold, the system immediately generates a shutdown signal at 88. The system then proceeds through the steps outlined including cutting off the fuel supply and interrupt at 90, activating the external engine shutdown device at 92, and activating second level alarm and message panel at 94. If neither non-critical or critical parameters are above threshold A, the system will repeat the cycle and continue monitoring.

The system 80 also includes the redundant engine shutdown system 14 that tests to determine if any engine parameter is above threshold C at 98. Threshold C is a threshold corresponding to or that is a slight variance from threshold B for multiple threshold parameters and threshold A for critical parameters. If threshold C is exceeded and engine control unit 12 has not already shutdown the engine, a redundant engine shutdown system generates an engine shutdown signal at 100 that disables the ECM or interrupts the ignition at 102. The shutdown engine signal also activates the external engine shutdown device at 104 and activates the alarm and message panel at 106. If the engine parameters are not above threshold C at 98, it is determined whether any non-engine parameter is above threshold C at 108. If so, for instance if a hazardous combustible gas is detected at 108, an engine shutdown signal is generated at 100 and engine shutdown is initiated by the redundant engine shutdown system 14. If no non-engine parameter is above threshold C, the redundant engine shutdown system 14 continues to monitor engine operation with engine function sensors and non-engine parameter sensors.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An engine control system and engine, in combination, comprising:

at least one engine electronic control module that controls engine operation in normal operating conditions in accordance with software and includes calibrations for engine control, the engine module having a primary shut down system programmed to shut down the engine if one or more of a plurality of engine operation sensors deviates from an acceptable level; and at least one shut down system electronic control module that is programmed to shut down the engine if one or more of the plurality of engine operation sensors deviates from the acceptable level.

2. The engine control system of claim 1 wherein the engine and shut down system electronic control modules are structurally identical but are programmed differently so that the engine module provides full engine control functions including the software for engine shut down and the shut down system module has software to provide engine shut down.

3. The engine control system of claim 1 wherein the engine and shut down system electronic control modules are both programmed to provide full engine control functions including the software for engine shut down so that the shut down system electronic control module can be used in place of the engine electronic control module.

4. The engine control system of claim 1 wherein both the engine and shut down system electronic control modules monitor a coolant temperature to determine if it is above a threshold level.

5. The engine control system of claim 1 wherein both the engine and shut down system electronic control modules monitor an oil temperature to determine if it is above a threshold level.

6. The engine control system of claim 1 wherein both the engine and shut down system electronic control modules establish a value corresponding to an exhaust temperature to determine if it is above a threshold level.

7. The engine control system of claim 1 wherein both the engine and shut down system electronic control modules monitor engine vibration to determine if it is above a threshold.

8. The engine control system of claim 1 wherein both the engine and shut down system electronic control modules establish a value corresponding to a turbocharger compressor outlet temperature to determine if it is above a threshold.

9. The engine control system of claim 1 wherein both the engine and shut down system electronic control modules monitor an oil pressure to determine if it is above a threshold.

10. The engine control system of claim 1 wherein both the engine and shut down system electronic control modules monitor a coolant level to determine if it is below a threshold.

11. The engine control system of claim 1 wherein both the engine and shut down system electronic control modules monitor an engine oil level to determine if it is below a threshold.

12. The engine control system of claim 1 wherein both the engine and shut down system electronic control modules monitor an engine RPM value to determine if it is above a threshold.

13. The engine control system of claim 1 wherein both the engine and shut down system electronic control modules monitor an intercooler temperature to determine if it is above a threshold.

14. The engine control system of claim 1 wherein the electronic control modules monitor a gas detection sensor for sensing the presence of potentially dangerous gases in the air around the engine.

15. The engine control system of claim 1 wherein the electronic control modules monitor a transmission temperature indicating system.

16. The engine control system of claim 1 wherein if any of the engine operation sensors indicates a deviation from the acceptable level and the primary shut down device fails to shut down the engine, the shut down system module will trigger an external shut down system.

17. The engine control system of claim 16 wherein the external shut down system is a Halon injection system.

18. The engine control system of claim 16 wherein the external shut down system is an air shut off valve.

19. The engine control system of claim 1 wherein if any of the engine operation sensors indicates a deviation from the acceptable level and the primary shut down system fails to shut down the engine, the shut down system will activate an alarm.

20. The engine control system of claim 1 wherein if any of the engine operation sensors indicates a deviation rom the acceptable level and the primary shut down system fails to shut down the engine, the redundant shut down system will send a shut down command to the engine electronic control module by a digital communication link.

* * * * *